G. KANTER.
AUTOMATIC PNEUMATIC VEHICLE WHEEL.
APPLICATION FILED OCT. 19, 1911.

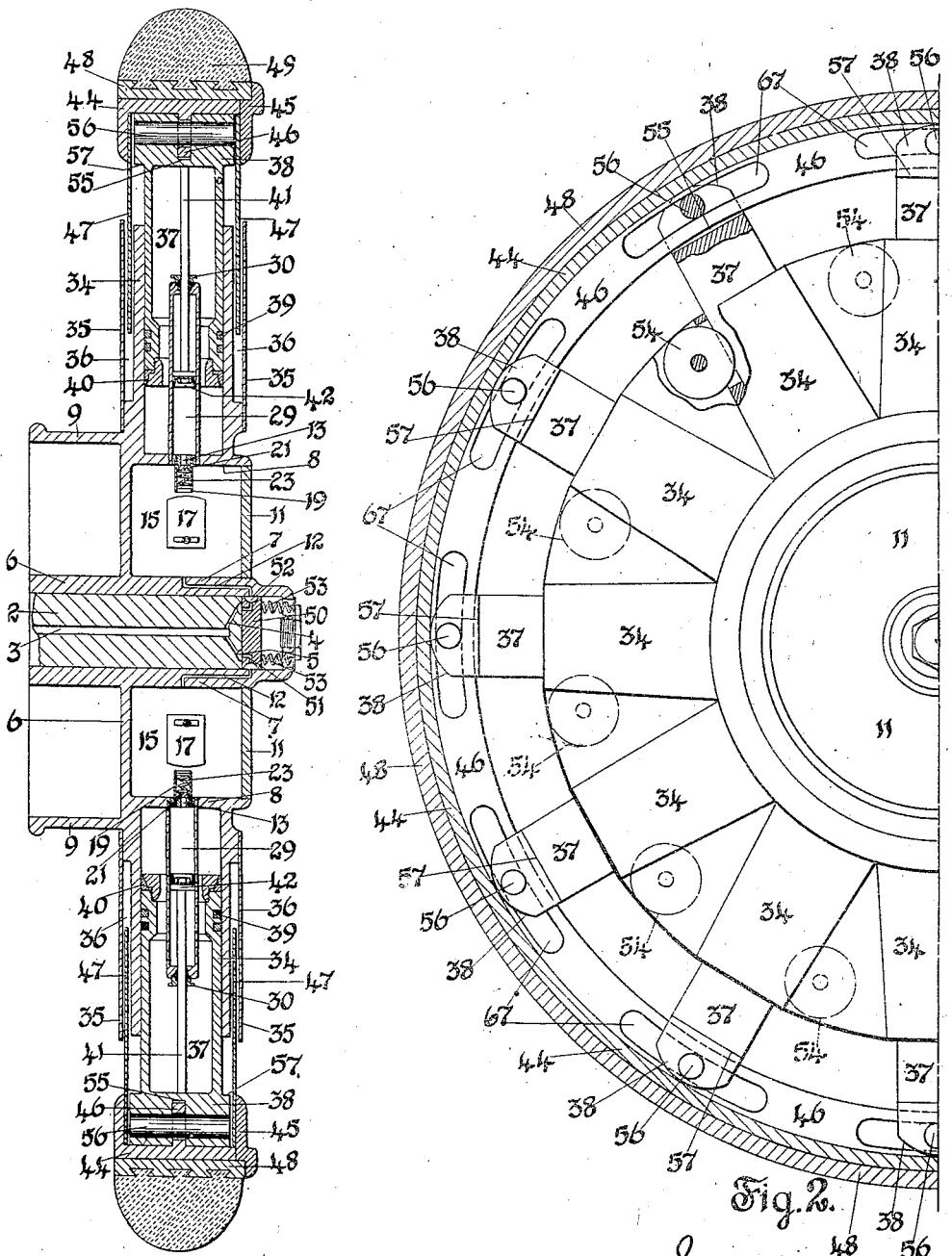

1,057,846.

Patented Apr. 1, 1913

2 SHEETS—SHEET 2

Witnesses:
James B. Mansfield
W. F. Wakefield

Inventor:
Gustav Kanter
By
Alexander & Lowell
Attorneys

United States Patent Office.

GUSTAV KANTER, OF MURTOA, VICTORIA, AUSTRALIA.

AUTOMATIC PNEUMATIC VEHICLE-WHEEL.

1,057,846.

Specification of Letters Patent.

Patented Apr. 1, 1913.

Application filed October 19, 1911. Serial No. 655,556.

*To all whom it may concern:*

Be it known that I, GUSTAV KANTER, a subject of the Emperor of Germany and King of Prussia, and a resident of Hamilton street, in the post-town of Murtoa, in the county of Borung, State of Victoria, Commonwealth of Australia, have invented certain new and useful Improvements in Automatic Pneumatic Vehicle-Wheels, of which the following is a specification.

This invention relates to pneumatic vehicle wheels having spokes consisting of cylinders and pistons, such as described in the specification of my concurrent application filed previous hereto, and has for its object to provide simple means for automatically providing and maintaining air pressure within the cylinders, and also to provide for an over production of compressed air, the surplus being used for purposes such as providing pressure in pneumatic shock absorbers, and other than pneumatically supporting a vehicle through the medium of the wheels.

With piston spoke wheels having the cylinders thereof communicating with an annular chamber within the wheel hub, it will readily be recognized that, when the pistons are in active operation, what may be termed compression and expansion zones are set up in the said wheel. If the zones be maintained distinctly defined it will further be observed that advantage may be taken of the travel of the pistons, when in the expansion zone, to draw air into suitable pumps, which air, when the pistons are in the compression zone, may be discharged into the annular chamber. The compression within the wheel may therefore not only be always automatically maintained but a surplus provided, which, if led from the chamber, could be utilized in such devices as pneumatic shock absorbers, and for other purposes, such as described in my concurrent application filed subsequent hereto.

The present invention aims at giving effect to the foregoing possibilities. But in order that this invention may be better understood reference will now be made to the accompanying sheets of drawings which are to be taken as part of this specification and read herewith.

Figure 3:
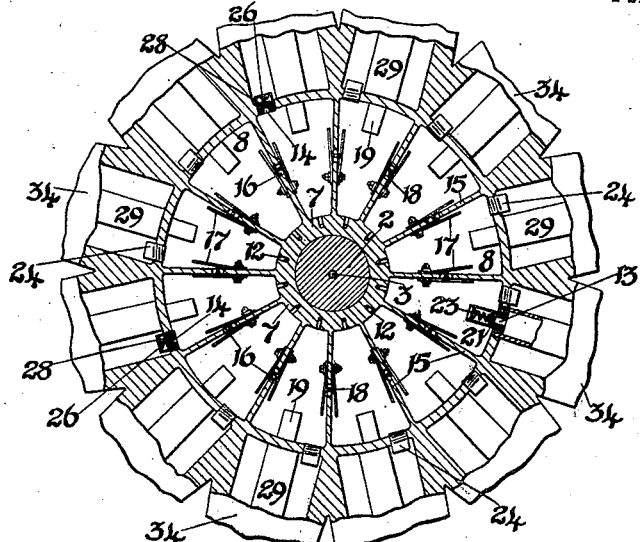
Figure 4:
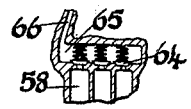
Figure 5:
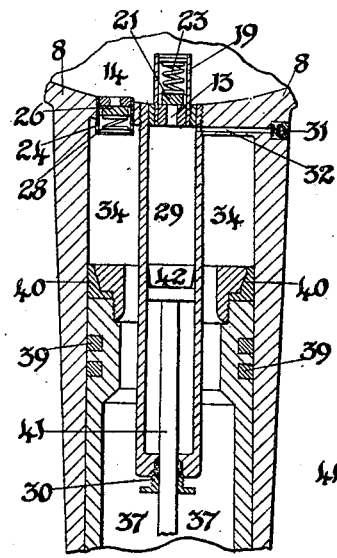
Figure 6:
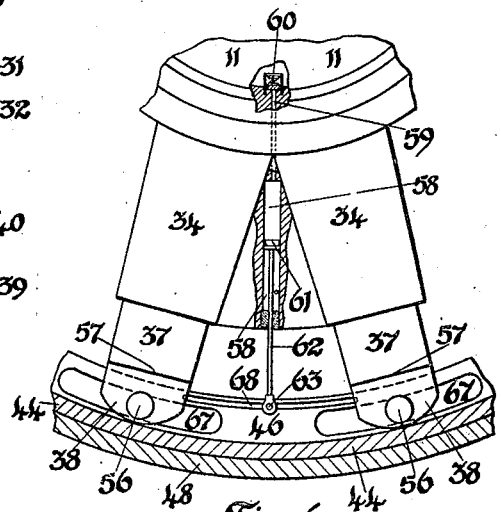

Figure 1 is a sectional elevation of a wheel according to this invention. Pistons hereinafter described are shown in their normal positions i. e. the wheel is inflated. Fig. 2 is a side part sectional elevation of half of a wheel, portions being broken away or removed for convenience of illustration. Fig. 3 is a sectional view showing the hub of the wheel. Fig. 4 is a detail view to show an arrangement of a series of subsidiary pumps. Fig. 5 is an enlarged cross section of portion of the hub and a cylinder. Fig. 6 is a view showing a modification including subsidiary pumps.

The invention includes (Fig. 1) an axle 2 having therein a longitudinal air delivery port 3. At the end of the axle, leading to the said delivery port 3, are a series of radial air ports 4 communicating with an annular groove 5 formed in the end of the said axle. Bearing against the axle end is a delivery disk 50 having therein a series of air ports 51 communicating with the annular groove 5. Formed in the circumference of the disk is a circumferential groove 52. Retaining the disk in engagement with the end of the axle is a series of spiral thrust springs 53 hereinafter referred to. Upon the said axle is mounted a wheel consisting of a hub 6 having an inner wall 7 and an outer wall 8. The hub may also be provided with a brake flange 9. Within the hub is an annular chamber closed by a closing plate 11. In the inner wall 7 are formed a series of air outlet ports 12 communicating with the circumferential groove 52. Formed in the outer wall 8 are a series of air inlet orifices 13 and air outlet orifices 14.

Dividing the annular chamber of the hub into a series of compartments (Fig. 3) are a number of partitions 15 each having therein a hole or passage 16. Pivoted at each side of each partition is a flap valve 17. Two flap valves are therefore provided for each partition. Uniting each pair of flap valves is a link 18.

Inclosing (Figs. 1, 3 and 5) the air inlet orifices 13 and projecting inwardly or into the hub annular chamber are a series of tubes 19, within each of which is an air inlet non-return disk valve is controlled by a spring 23. Encircling (Figs. 3 and 5) each air outlet orifice 14 and projecting outwardly from the outer wall 8 are a series of tubes 24 within each of which is an air outlet non-return disk valve 26 controlled by a spring 28. Projecting outwardly from the outer wall 8 and encircling each air inlet orifice 13 are a series of pump barrels 29 each having a gland 30. Each pump barrel (Fig. 5) has an air entrance controlled by a first non-return valve 31. This also controls an air inlet passageway 32.

Projecting from the outer wall 8 of the hub 6 and inclosing the pump barrels 29 and tubes 24 are a series of radial cylinders 34. Each cylinder is closed at its inner end and open at its outer end. Projecting into the driving side of each cylinder near the outer end of the same, (Fig. 2), is a thrust roller 54. Also protruding from the hub 6 are two outer circumferential plates 35 between which and the cylinders 34 are sliding spaces 36. Within each cylinder 34 is a major hollow piston 37 having a closed outer end 38. In (Fig. 1) each closed outer end 38 is a groove or slot 55. Extending across each groove or slot 55 is a cross pin 56. Each outer end 38 is also enlarged providing limit stops or protuberances 57. Each piston 37 is open at its inner end and provided with spring rings 39 and a cup leather 40. Within and secured to the closed outer end of each piston 37 (Figs. 1 and 5) is the outer end of a piston rod 41 secured to the inner end of which is a minor piston 42. Each minor piston is accommodated by a pump barrel 29. Between (Fig. 6) each cylinder 34 and its fellow or that adjoining it may be formed a subsidiary pump cylinder 58 communicating with the annular chamber within the hub by a passageway 59. Each passageway is controlled by a non-return valve 60. Within each cylinder 58 is a subsidiary piston 61 secured to the inner end of a subsidiary piston rod 62. Attached to the outer end of each piston rod 62 is a subsidiary cross pin 63. Or (Fig. 4) instead of only one subsidiary cylinder 58 being formed between each cylinder 34 and that adjoining it a multiplicity of subsidiary cylinders 58 may be provided. Each is then controlled by a non-return valve 64 and communicates with a chamber 65 above the said cylinders. Each chamber 65 communicates with the annular hub chamber by a passageway 66 which may be controlled by a non-return valve (not shown).

With the foregoing is used a floating rim consisting of a channel member 44 provided with a removable flange 45. Protruding inwardly from the channel member 44 is a circumferential rib 46 formed in which is a plurality of major slotways 67 and also a plurality of subsidiary slotways 68 when subsidiary pumps are used. The slotways 67 accommodate the cross pins 56 and the subsidiary slotways 68 accommodate the subsidiary cross pins 63. Projecting inwardly from the channel member 44 are also two inner circumferential plates 47 accommodated by the sliding spaces 36 aforementioned. Secured to the outside of the channel member 44 is an outer member 48 to which may be attached a suitable tire 49.

With this invention when a wheel is deflated the hub and floating rim are eccentric and the limit stops or protuberances 57 of the major pistons engage, in turn, with the outer ends of the cylinders 34. Spring or cushion limit stops of any character may be used if desired. Each of the pistons in the compression zone or lower half of the wheel therefore successively reaches its maximum inward stroke. But as the pistons by the wheel's rotation pass into the expansion zone each successively reaches its maximum outward stroke. The action of the pistons 42 gradually inflates the wheel causing the floating rim and the hub to become concentric. Upon the inflated wheel meeting an obstruction in the road surfaces the hub and the floating rim momentarily become eccentric to each other. The pistons 37 affected, then rise in their cylinders 34 and with them rise the minor pistons 42. These force air from the pump barrels 29 into the relative compartments within the annular chamber. The air cannot return because of the non-return valves 21, but obtains access to the cylinders 34 through the non-return valves 26. The compartments upon the lower side of the wheel, that is, those which may be termed the compression compartments, are separated from those on the upper half of the wheel, which may be termed expansion compartments, by reason of the flap valves 17. One of each pair of these, as it reaches a horizontal plane, closes against its partition 15 thereby keeping the annular chamber clearly defined into two zones, that is, the compression zone and the expansion zone.

As the major pistons 37 move outwardly from their cylinders 34 the minor pistons 42 also move outwardly in their pump barrels 29 drawing air thereinto through the non-return valves 31. Upon the minor pistons 42 moving inwardly in their barrels 29 the air therein is forced into the relative compartment of the annular chamber. The subsidiary pistons 61 also reciprocate with the major and minor pistons 37 and 42 forcing air into the annular chamber of the hub; and also provide, until the pressure within their cylinders 58 becomes greater than that within the annular hub chamber a pneumatic cushion between the cylinders 34 of the wheel. Upon an obstruction being met it will also be clear that the cross pins 56 and 63 move in their slotways 67 and 68 the floating rim then becoming eccentric with the hub and moving all of the piston as already described.

It will be clear that the ports 12 could, of course be dispensed with and the air be confined to the cylinders and annular hub chamber, when suitable relief valves may if necessary be provided, but it will be seen that when outlet ports from the chamber are used, as shown, the air within the annular chamber passes freely through the air outlet ports 12 to the annular groove 52 in the disk 50. From the groove 52 it passes through the ports 51 to the groove 5. From the groove 5 the air passes through the radial ports 4 to the air delivery port 3 from which it may be transferred to any desired device for any suitable purpose. Shock absorbers or the like may be inflated by the said air, such as described in the concurrent application filed herewith. When the axle 2 is a live axle the delivery disk 50 and the wheel naturally rotate with it but when the axle is fixed or a dead axle the disk is rotated with the wheel by means of a pin or the like. Axial thrust is absorbed by the spiral springs 53.

Having now described my invention, what I claim as new and desire to secure by Letters Patent is:—

1. In automatic pneumatic vehicle wheels, a hub having an annular chamber therein, a series of cylinders communicating with said chamber, a major piston in each cylinder, a series of pumps within said cylinders and communicating with said chamber, partitions dividing said chamber into compartments and valves controlling communication between said compartments.

2. In automatic pneumatic vehicle wheels, a hub having an annular chamber therein, a series of cylinders projecting from said hub and in communication with said chamber, a barrel within each cylinder and in communication with the atmosphere, a hollow major piston closed at its outer end within each cylinder, a slot in said closed outer end, a cross pin extending across said slot, a piston rod having a piston attached thereto secured to each major piston and operated by the movement thereof, a floating rim having a channel member around the major pistons, and a series of slotways in said channel member accommodating the cross pins carried by the major pistons.

3. In automatic pneumatic vehicle wheels, a hub having an annular chamber therein, partitions extending across said chamber and dividing the same into compartments, valves pivoted to each partition and controlling communication between the compartments, a cylinder projecting from said hub in relation to each compartment and in communication therewith, a major piston within each cylinder, a pump communicating with each compartment and a floating rim around the major pistons and operating the pumps by its movement.

4. In automatic pneumatic vehicle wheels, a hub having an annular chamber therein and a series of partitions dividing said chamber into compartments, a passage in each partition, and flap valves pivoted to said partitions and controlling said passages.

5. In automatic pneumatic vehicle wheels, a hub having an annular chamber therein, a series of air inlet orifices communicating with said chamber, a non-return valve controlling each orifice, a series of air outlet orifices communicating with said chamber, a non-return valve controlling each orifice, a pump barrel encircling each inlet orifice, a radial cylinder inclosing each pump barrel, a major piston within each cylinder, a piston rod carried by each major piston and minor pistons secured to the piston rods and accommodated by the pump barrels.

6. In automatic pneumatic vehicle wheels, a hub having an annular chamber therein, a series of cylinders projecting from said hub and in communication therewith, a barrel within each cylinder and in communication with the atmosphere, a hollow major piston closed at its outer end within each cylinder, a slot in said closed outer end, a cross pin extending across said slot, a piston rod having a piston attached thereto, secured to each major piston and operated by the movement thereof, and a floating rim having a channel member around the major pistons.

7. In combination, a tubular axle, a pneumatic vehicle wheel having a hub provided with an air chamber fitted to the axle, means for directing air from the chamber to the tubular axle, and means for forcing air into said hub during its rotation.

8. In combination, an axle having a port, a wheel hub around said axle, an annular series of chambers within said hub, and ports directing air from said chambers to the port in said axle.

9. In combination, an axle having an air delivery port, a hub upon said axle having an annular series of chambers, cylinders projecting from said hub in communication with said chambers, a major piston in each cylinder, and a floating rim around said pistons.

In testimony whereof, I affix my signature in presence of two witnesses

GUSTAV KANTER.

Witnesses:
 GEORGE A. U'REN,
 CECIL N. J. SCASTREES.